(12) United States Patent
Lewis et al.

(10) Patent No.: US 11,555,793 B1
(45) Date of Patent: Jan. 17, 2023

(54) ANTI-VIBRATION FIXTURING SYSTEM FOR NONDESTRUCTIVE TESTING

(71) Applicant: International Business Machines Corporation, Armonk, NY (US)

(72) Inventors: Theron Lee Lewis, Rochester, MN (US); David J. Braun, St. Charles, MN (US); John R. Dangler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/393,479

(22) Filed: Aug. 4, 2021

(51) Int. Cl.
*G01N 23/046* (2018.01)

(52) U.S. Cl.
CPC ..... *G01N 23/046* (2013.01); *G01N 2223/419* (2013.01); *G01N 2223/6113* (2013.01); *G01N 2223/66* (2013.01)

(58) Field of Classification Search
CPC .......... G01N 23/046; G01N 2223/419; G01N 2226/6113; G01N 2223/66
See application file for complete search history.

(56) References Cited

U.S. PATENT DOCUMENTS

| | | | |
|---|---|---|---|
| 5,097,492 A | 3/1992 | Baker et al. | |
| 5,425,067 A | 6/1995 | Sano et al. | |
| 5,831,160 A * | 11/1998 | Steketee | G01R 1/04 |
| | | | 73/431 |
| 7,189,972 B2 | 3/2007 | Ertel et al. | |
| 7,305,066 B2 | 12/2007 | Ukita | |
| 10,145,806 B2 | 12/2018 | Tanaka | |
| 10,788,435 B2 * | 9/2020 | Karlen | G01N 23/046 |
| 2006/0113131 A1 | 6/2006 | Kato | |
| 2011/0057103 A1 * | 3/2011 | Nishina | G01N 21/3581 |
| | | | 324/637 |
| 2015/0300963 A1 * | 10/2015 | Haidekker | G06T 11/008 |
| | | | 382/131 |

FOREIGN PATENT DOCUMENTS

| | | |
|---|---|---|
| CN | 212975167 U | 4/2021 |
| WO | 2009121051 A2 | 10/2009 |

OTHER PUBLICATIONS

Wikipedia, "Industrial computed tomography", From Wikipedia, the free encyclopedia, last edited on Dec. 8, 2020, 3 pages, <https://en.wikipedia.org/wiki/Industrial_computed_tomography>.
Du Plessis et al., "Laboratory x-ray micro-computed tomography: a user guideline for biological samples", Published online Apr. 1, 20177, 17 pages, <https://www.ncbi.nlm.nih.gov/pmc/articles/PMC5449646/>.

(Continued)

*Primary Examiner* — David P Porta
*Assistant Examiner* — Mamadou Faye
(74) *Attorney, Agent, or Firm* — Stosch Sabo

(57) ABSTRACT

Described is an anti-vibration fixture comprising a radiolucent enclosure and a vibration-dampening material attached to an inside face of the radiolucent enclosure. The vibration-dampening material is configured to receive a component for nondestructive testing by computed tomography (CT) scanning. The anti-vibration fixture further comprises a plurality of fasteners attached to opposing faces of the radiolucent enclosure.

20 Claims, 4 Drawing Sheets

(56) References Cited

OTHER PUBLICATIONS

Kozyrev et al., "X-ray Tomography using Thin Scintillator Films", Proceedings of the CERN-BINP Workshop for Young Scientists in e+e—Colliders, Aug. 22-25, 2016, 5 pages.

"Patent Cooperation Treaty PCT Notification of Transmittal of the International Search Report and the Written Opinion of the International Searching Authority, or the Declaration", Applicant's file reference P202101597, International Application No. PCT/EP2022/069786, International Filing date Jul. 14, 2022, dated Oct. 17, 2022, 22 PGS.

* cited by examiner

ANTI-VIBRATION FIXTURING SYSTEM FOR NONDESTRUCTIVE TESTING

BACKGROUND

The present disclosure relates to anti-vibration fixturing, and, more specifically, to anti-vibration fixturing for nondestructive testing (NDT) of manufactured components.

Nondestructive testing (NDT) can also be referred to as nondestructive examination (NDE), nondestructive inspection (NDI), and nondestructive evaluation (NDE). NDT constitutes testing that does not permanently alter the component that is undergoing inspection. Example NDT techniques include eddy-current testing, magnetic-particle testing, liquid penetrant testing, radiographic testing, ultrasonic testing, x-ray computed tomography (CT), and visual testing.

SUMMARY

Aspects of the present disclosure are directed toward an anti-vibration fixture comprising a radiolucent enclosure and a vibration-dampening material attached to an inside face of the radiolucent enclosure. The vibration-dampening material is configured to receive a component for nondestructive testing by computed tomography (CT) scanning. The anti-vibration fixture further comprises a plurality of fasteners attached to opposing faces of the radiolucent enclosure.

Additional aspects of the present disclosure are directed toward a system comprising a computed tomography (CT) scanner for nondestructive testing, the CT scanner comprising a CT source and a CT detector. The system further comprises an anti-vibration fixture positioned between the CT source and the CT detector, where the anti-vibration fixture comprises a radiolucent enclosure and a vibration-dampening material attached to an inside face of the radiolucent enclosure and configured to receive a component for nondestructive testing by the CT scanner. The anti-vibration fixture further comprises a plurality of fasteners attached to opposing faces of the radiolucent enclosure.

Additional aspects of the present disclosure are directed toward a method comprising installing an anti-vibration fixture in a Computed Tomography (CT) scanner between a CT source and a CT detector. The anti-vibration fixture comprising a radiolucent enclosure and a vibration-dampening material attached to an inside face of the radiolucent enclosure and configured to receive a component for nondestructive testing by the CT scanner. The anti-vibration fixture further comprising a plurality of fasteners attached to opposing faces of the radiolucent enclosure. The method further comprises placing the component for nondestructive testing in the radiolucent enclosure and against the vibration-dampening material and closing the radiolucent enclosure by actuating the plurality of fasteners to a predetermined torque. The method further comprises performing CT imaging on the component for nondestructive testing in the anti-vibration fixture using the CT scanner.

The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1A:
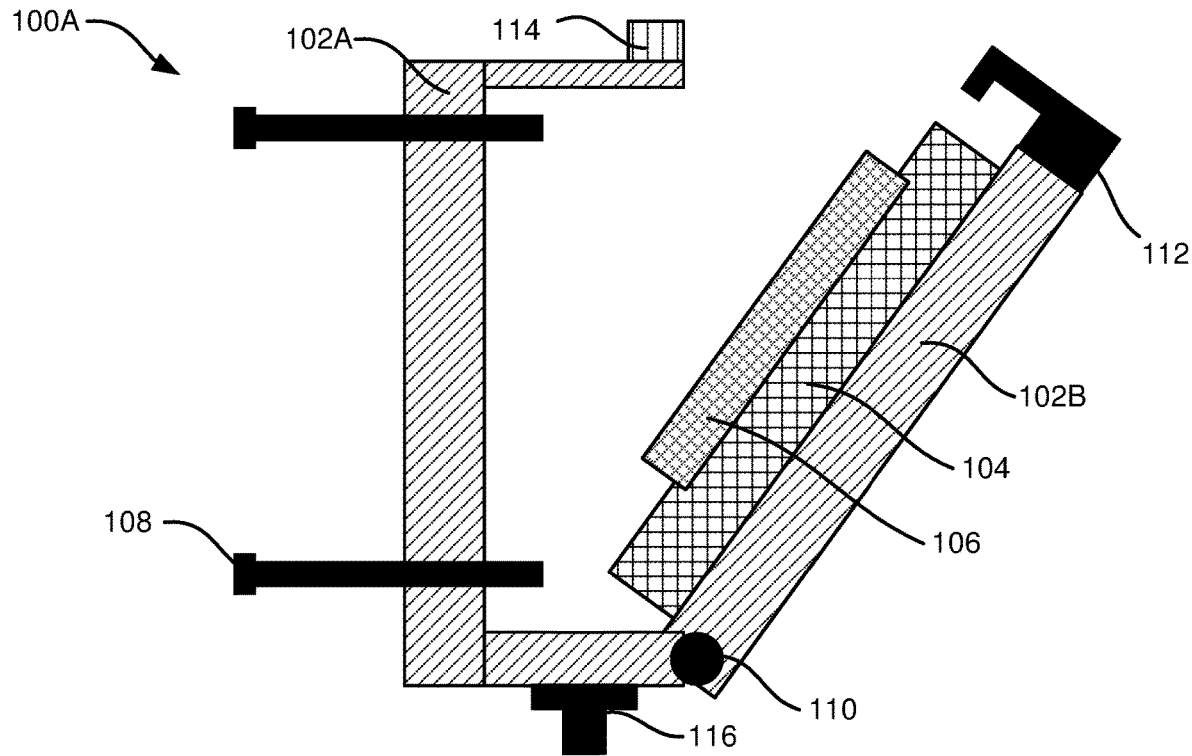
FIG. 1A illustrates a block diagram of an example anti-vibration fixture in an open position, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward anti-vibration fixturing, and, more specifically, to anti-vibration fixturing for nondestructive testing (NDT) of manufactured components. While not limited to such applications, embodiments of the present disclosure may be better understood in light of the aforementioned context.

Industrial computer tomography (CT) scanning utilizes X-ray equipment to generate two-dimensional (2D) and/or three-dimensional (3D) representations of internal and/or external structures of components undergoing the CT scanning. Industrial CT scanning can be used for flaw detection, failure analysis, assembly analysis, reverse engineering, and/or other purposes.

Industrial CT scanning can use line beam scanning, cone beam scanning, or other scanning techniques. In line beam scanning, X-rays are produced at a CT source and the beam is collimated to create a line. The X-ray line beam is then translated across a part undergoing the CT scanning, and a detector is used collect X-ray data for X-rays that traverse the part. The data from the detector can then be used to reconstruct the part using 3D volume rendering.

In contrast, cone beam scanning occurs when a part undergoing CT scanning is placed on a rotary table. As the part rotates, the cone of X-rays produced at the CT source are directed toward the part, and the CT detector generates data that can be used to produce many 2D images. The 2D images can then be taken together to create a 3D volume rendering of the part.

In cone beam CT scanning, if the part moves, vibrates, or otherwise shifts while rotating during scanning, the resulting images can be blurry, indistinct, and/or unusable for NDT. This problem is exacerbated for parts that are relatively heavier and/or larger insofar as heavier and/or larger parts develop more momentum while rotating. This developed momentum can cause vibration, shifting, or other movement during the cone beam CT scanning, thereby degrading or ruining the CT scans.

Various ad-hoc measures can be taken to reduce movement or vibration during scanning. For example, parts undergoing CT scanning can be rigidly attached to the rotary table using excessive tape, long loading arms (e.g., clamps, pincers, or other stabilizing arms), and the like. As another example, the rotary table can be programmed to pause for a predetermined period of time after each rotation, where the predetermined period of time is sufficient for any vibration or movement to dissipate. Disadvantageously, these solutions are insufficient. Regarding the various strategies for taping or clamping a part to the rotary table, these solutions are only applicable for relatively smaller parts, or parts with geometries conducive to taping and/or clamping. Regarding the preprogrammed stoppage time after each rotation, this results in decreased efficiency and loss of valuable CT scanner time. Accordingly, there is a need for techniques to overcome the aforementioned challenges related to part vibration, movement, and/or shifting during CT scanning.

Aspects of the present disclosure are directed toward an anti-vibration fixture for industrial CT scanning. The anti-vibration fixture is configured to securely hold a part for CT scanning and reduce or eliminate movements, shifts, and/or vibrations within the part during CT scanning—thereby improving the quality of the resulting images.

FIGS. 1A, 1B, 2, and 3 illustrates various configurations of the anti-vibration fixture. Each of FIGS. 1A, 1B, 2, and 3 are illustrated as side-view cross-sections. Thus, the features illustrated in FIGS. 1A, 1B, 2, and 3 are features that may be directly or indirectly observable in a cutaway side-profile of the anti-vibration fixture, where the cutaway is made at one or more planes intersecting the anti-vibration fixture.

The dimensions, whether absolute or relative, shown in FIGS. 1A, 1B, 2, and 3 are purely illustrative and should not be taken as limiting. Shapes and sizes of components as shown in FIGS. 1A, 1B, 2, and 3 are non-limiting. Likewise, relationships between components as shown in FIGS. 1A, 1B, 2, and 3 are non-limiting. Further still, embodiments of the present disclosure exist that can utilize more, fewer, and/or different components than the components shown in FIGS. 1A, 1B, 2, and 3 while remaining in the spirit and scope of the present disclosure.

Referring now to the figures, FIG. 1A illustrates a block diagram of an example anti-vibration fixture 100A in an open position, in accordance with some embodiments of the present disclosure. The anti-vibration fixture 100A includes a radiolucent enclosure 102, where the radiolucent enclosure 102 is illustrated with two opposing faces, namely, face 102A and face 102B. Thus, in some embodiments, the radiolucent enclosure 102 is clam-shaped, meaning that it has two opposing faces (whether curved or planar) capable of hinging between an open position (e.g., where the two opposing faces are not parallel) and closed position (e.g., where the two opposing faces are approximately or substantially parallel).

Radiolucent enclosure 102 can be comprised of a radiolucent material (e.g., a material that has low visibility or no visibility in a CT scan) that has a sufficiently high elastic modulus (e.g., to provide adequate structural support to the anti-vibration fixture 100A). Radiolucent materials are generally materials that have relatively lower atomic weight and/or density. Examples of low atomic weight materials that may exhibit sufficiently high elastic modulus include continuous fiber-reinforced polymer-matrix composites (PMC), discontinuous fiber-reinforced PMCs, thermoset plastics, thermoplastics, and/or other polymeric materials.

Thermoset plastics are plastics that undergo an irreversible chemical reaction (curing) which transforms the thermoset plastic from a resin to a solid. Curing can be initiated by heat, radiation, light, a catalyst, pressure, or a combination of the aforementioned. Example thermoset plastics can include thermosetting acrylics, epoxies, polyurethanes, phenolics, polybenzoxazines, polyesters, cyanate esters, silicone resins, vinyl esters, and others.

Thermoplastics are plastics that soften at elevated temperatures and harden upon cooling. Example thermoplastics include polymethyl methacrylate (PMMA), acrylonitrile butadiene styrene (ABS), Nylon, polylactic acid (PLA), polybenzimidazole, polycarbonate (PC), polyether sulfone (PES), polyoxymethylene (POM), polyether ether ketone (PEEK), polyetherimide (PEI), polyethylene (PE)—including ultra-high-molecular weight polyethylene (UHMWPE), high-density polyethylene (HDP), medium-density polyethylene (MDPE), and low-density polyethylene (LDPE), polyphenylene sulfide (PPS), polypropylene (PP), polystyrene, polyvinyl chloride (PVC), polyvinylidene fluoride (PVDF), polytetrafluoroethylene (PTFE), and others.

Various PMCs can have any thermoset or thermoplastic as the polymer matrix. Further, whether reinforced with continuous reinforcement (e.g., substantially unbroken fibers extending a length, width, or thickness of a component) or discontinuous reinforcement (e.g., short, medium, or long fibers that extend less than a length, width, or thickness of a component), the reinforcement of PMCs can include carbon fiber, glass fiber, aramid fiber, natural fibers, a mix of fibers, or other fibers.

Some example manufacturing techniques for PMCs include wet layup (e.g., hand layup), autoclave, heated or unheated compression, extrusion, protrusion, pultrusion, filament winding, compression molding, transfer molding, injection molding, rotational molding (rotomolding), thermoforming, resin transfer molding (RTM), vacuum assisted resin transfer molding (VARTM), spray-up molding, reaction injection molding, and the like. Many of the aforementioned manufacturing techniques are equally applicable to thermoset and/or thermoplastic manufacturing (e.g., plastics without reinforcement).

A vibration-dampening pad 104 is affixed to an inside face (e.g., face 102B) of radiolucent enclosure 102. The vibration-dampening pad 104 is any material capable of sufficiently absorbing vibrations that may be transferred through the radiolucent enclosure 102 to a component for NDT 106 as a result of rotating the anti-vibration fixture 100A during CT scanning. The vibration-dampening pad 104 can be a silicone rubber, silicone foam, a synthetic rubber (e.g., styrene butadiene rubbers (SBR), Viton, ethylene propylene diene monomer (EPDM) rubber, polyisobutylene, polyisoprene, chloroprene, nitrile rubber, thermoplastic elastomer (TPE), etc.), a natural rubber, an elastomer, or another material with sufficient vibration-dampening characteristics. The vibration-dampening pad 104 has the component for NDT 106 attached to it. In some embodiments, the component for NDT 106 is press-fit into the vibration-dampening pad 104, adhesively bonded (e.g., temporarily) to the vibration dampening pad 104, mechanically fastened to the vibration-dampening pad 104, or sandwiched between two vibration dampening pads 104 and held in place by friction (not shown in the figures). In some embodiments, the vibration-dampening pad 104 includes cutouts, indentations, forms, or other characteristics for receiving the component for NDT 106.

The component for NDT 106 can be any manufactured part or assembly that benefits from CT scanning for NDT. In some embodiments, the component for NDT 106 comprises a printed circuit board (PCB). In such embodiments, the PCB can be relatively large (e.g., 24 inches (610 millimeters (mm)) wide, 30 inches (762 mm) tall, 3-4 inches (76-102 mm) thick), however, in other embodiments, the PCB can be any other size. As will be appreciated by one skilled in the art, as the size of the component for NDT 106 increases, its susceptibility to vibration during CT scanning also increases.

The anti-vibration fixture 100A can further include a hinge 110 coupling face 102B to a bottom portion of the radiolucent enclosure 102. The hinge 110 enables face 102B to be articulated (e.g., rotated, pivoted, etc.) open and closed, thereby allowing a technician or robotic arm to load and unload the component for NDT 106 from the anti-vibration fixture. Opposite the hinge 110 is a clasp 112 and block 114 configured to receive the clasp 112. The clasp 112 and block 114 are representative of any mechanical or other fastener (or fastening mechanism) for connecting (e.g., fastening, fixing, clasping, attaching, etc.) two edges of the radiolucent enclosure 102 together (e.g., the face 102B to the remainder of the radiolucent enclosure 102). The clasp 112 and block 114 can include a hook and ring connection, a push-fit connection, a snap-fit connection, a Velcro connection, a threaded (e.g., bolted) connection, a magnetic connection, a clamp connection, a vise connection, or the like.

In other embodiments, the hinge 110 and/or clasp 112 and block 114 can be located in alternative configurations of the anti-vibration fixture 100A. For example, the hinge 110 can be affixed to a side of the face 102B, thereby enabling the anti-vibration fixture 100A to open sideways. As another example, the hinge 110 can be affixed to a top of the face 102B, thereby enabling the anti-vibration fixture 100A to open from the bottom. The clasp 112 and block 114 can likewise be relocated as needed. Furthermore, more than one clasp 112 and block 114 can be utilized. Finally, in some embodiments, there is no hinge 110, clasp 112, or block 114. In such embodiments, the face 102A and face 102B can be directly connected (e.g., sandwiched together) using mechanical fasteners.

The anti-vibration fixture 100A further includes one or more pins 108 (e.g., fasteners) for connecting opposing faces 102A, 102B of the radiolucent enclosure 102 when in a closed position. The pins 108 can be, for example, threaded bolts that thread into receiving holes (not shown) in the vibration dampening pad 104 and/or the opposing face 102B. Any number of pins 108 can be used in various embodiments.

The anti-vibration fixture 100A further includes a chuck 116. The chuck 116 can be mechanically attached to the radiolucent enclosure 102. For example, the chuck 116 can utilize a clamp, vise, bolt, or other connection to mechanically attach to the radiolucent enclosure 102. The chuck 116 can be attached to a driveshaft (not shown) that causes the chuck 116 (and thereby the anti-vibration fixture 100A) to rotate, where the rotation is used to correctly perform CT imaging.

Although not explicitly shown in FIG. 1A, in some embodiments, the anti-vibration fixture 100A can include one or more alignment features such as, for example, windows, slots, holes, depressions, embosses, ledges, ribs, vanes, cutouts, and/or other features in the radiolucent enclosure 102 and/or the vibration-dampening pad 104. The alignment features can be used to properly orient, position, and/or otherwise configure the component for NDT 106 within the anti-vibration fixture 100A. As one example, holes can be cut in the radiolucent enclosure 102 through which should be visible each of the corners of the component for NDT 106. As another example, a hole matching a protuberance of the component for NDT can be made in the radiolucent enclosure 102 such that when the anti-vibration fixture 100A is closed, the protuberance interlocks with the hole in the radiolucent enclosure 102, thereby ensuring consistent orientation of each of numerous, similar components for NDT 106.

Figure 1B:
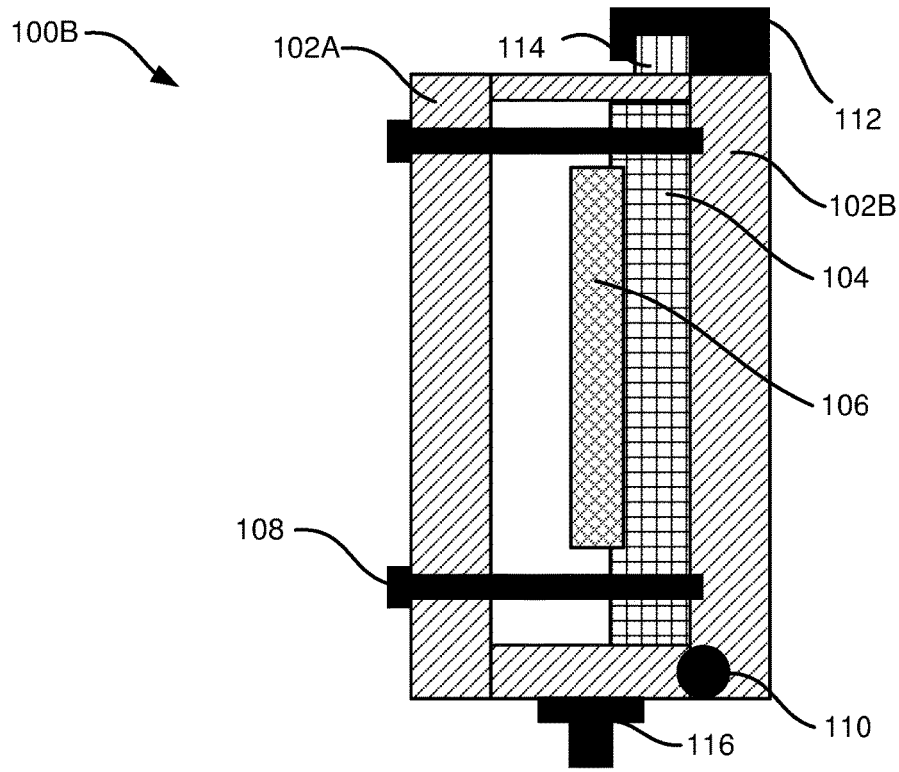
FIG. 1B illustrates a block diagram of an example anti-vibration fixture in a closed position, in accordance with some embodiments of the present disclosure.

FIG. 1B illustrates a block diagram of an example anti-vibration fixture 100B in a closed position, in accordance with some embodiments of the present disclosure. The anti-vibration fixture 100B illustrates the same components as discussed above with respect to FIG. 1A. In some embodiments, the pins 108 are torqued to a predetermined tightness to ensure consistent and sufficient closure of the anti-vibration fixture 100B. Advantageously, when in the closed position, the anti-vibration fixture 100B reduces vibration on the component for NDT 106 during CT imaging. Furthermore, the radiolucent enclosure 102 allows CT images to be unobstructed by the anti-vibration fixture 100B.

While FIG. 1A illustrates the anti-vibration fixture 100A in an open position, and FIG. 1B illustrates the anti-vibration fixture 100B in a closed position, the remainder of the disclosure generally refers to the anti-vibration fixture illustrated in FIGS. 1A and 1B as anti-vibration fixture 100.

Figure 2:
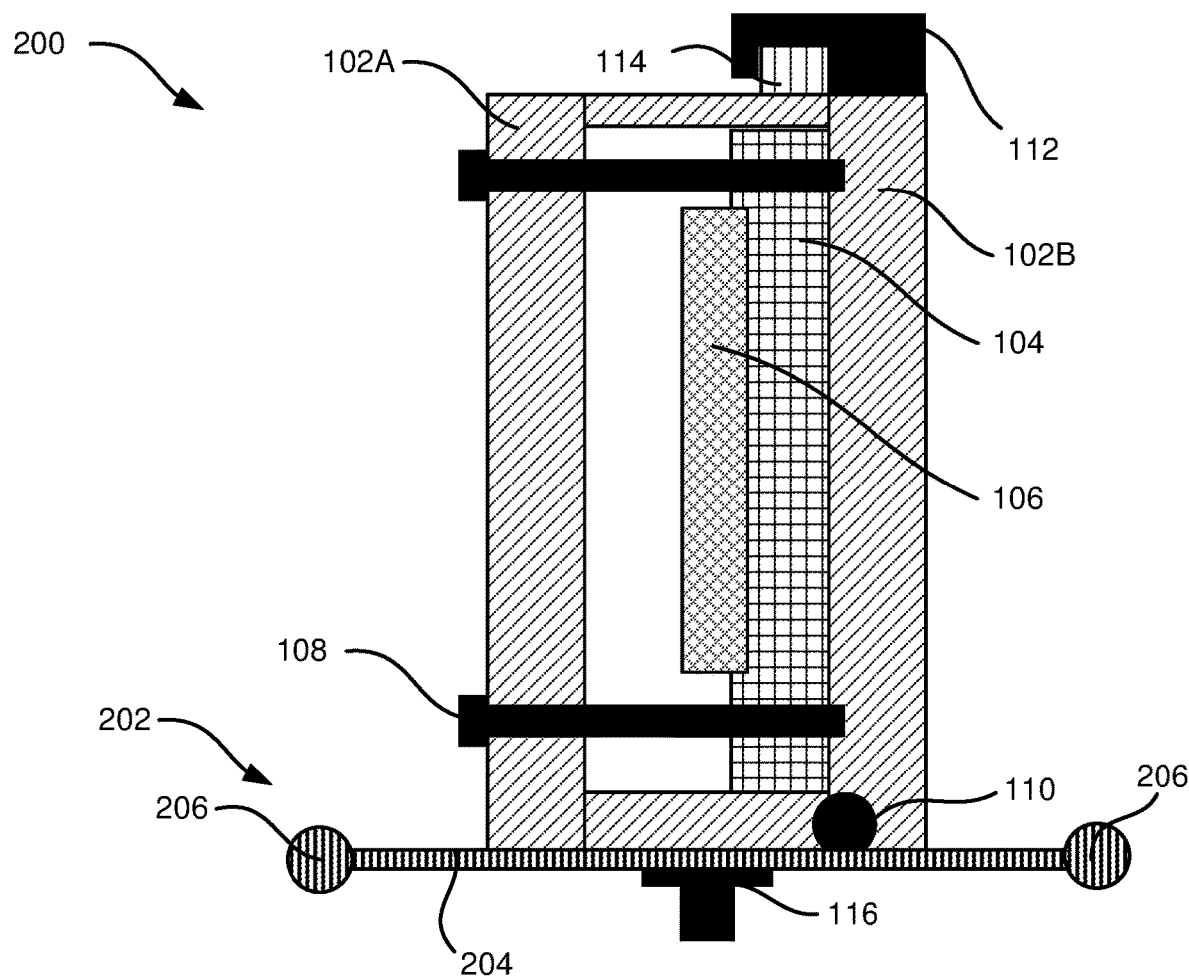
FIG. 2 illustrates a block diagram of an example anti-vibration fixture including an outrigger system, in accordance with some embodiments of the present disclosure.

FIG. 2 illustrates a block diagram of an example anti-vibration fixture 200 including an outrigger system 202, in accordance with some embodiments of the present disclosure. The anti-vibration fixture 200 includes the same components as discussed above with respect to FIGS. 1A and 1B. Furthermore, the anti-vibration fixture 200 includes an outrigger system 202 disposed between the chuck 116 and the radiolucent enclosure 102. The outrigger system 202 can be used to stabilize the radiolucent enclosure 102 during CT imaging rotation. Advantageously, the outrigger system 202 can lower the center of gravity of the anti-vibration fixture 200, thereby decreasing the amount of angular momentum and/or vibration developed by the component for NDT 106 housed in the anti-vibration fixture 200 during rotation.

The outrigger system 202 can be made of any of the aforementioned materials or a relatively denser material. For example, the outrigger system 202 can be made from a ferrous metal, a non-ferrous metal, an aluminum, an alloy, or the like. In some embodiments, the outrigger system 202 is made from a composite material with a dense particulate reinforcement (e.g., lead reinforcement) that substantially increases its density.

As shown in FIG. 2, the outrigger system 202 can include a connector 204 (e.g., the relatively thinner section projecting orthogonal to the component for NDT 106) that connects two opposing counterweights 206 and affixes the counterweights to the radiolucent enclosure 102 and the chuck 116. As shown in FIG. 2, the counterweights 206 can comprise parallel bars. In some embodiments, the outrigger system 202 can include differently sized or differently shaped counterweights 206. In some embodiments, the outrigger system 202 can include more or fewer counterweights 206 than the counterweights 206 shown in FIG. 2. For example, in some embodiments, the outrigger system 202 can include a single counterweight 206 (rather than the two shown), thereby making the outrigger system 202 asymmetrical. Advantageously, an asymmetrical outrigger system 202 with the single counterweight 206 can serve to (i) lower the center of gravity of the anti-vibration fixture 200, and (ii) align the center of gravity with the central axis of the chuck 116. Both (i) and (ii) (individually and in combination) can reduce vibration on the component for NDT 106 housed in the anti-vibration fixture 200. In other embodiments, the outrigger system 202 can include more counterweights 206, such as four counterweights 206 (e.g., one on each side of the anti-vibration fixture 200).

Figure 3:
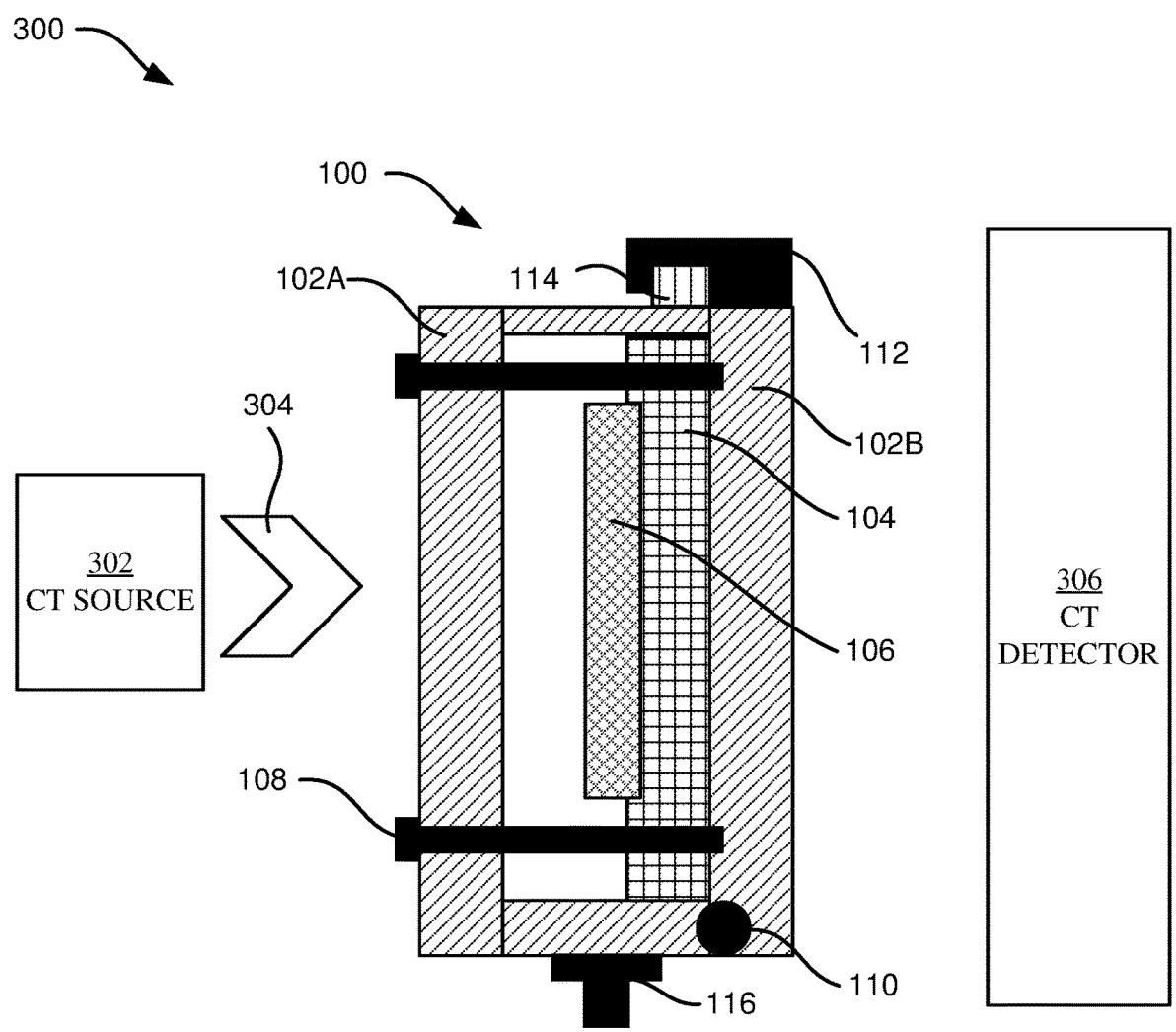
FIG. 3 illustrates a block diagram of an example CT scanner including an anti-vibration fixture for holding a part undergoing scanning, in accordance with some embodiments of the present disclosure.

FIG. 3 illustrates a block diagram of an example CT scanner 300 including an anti-vibration fixture 100, in accordance with some embodiments of the present disclosure. The anti-vibration fixture 100 includes the components previously discussed. Although anti-vibration fixture 100 is illustrated, the CT scanner 300 can alternatively include anti-vibration fixture 200 with the outrigger system 202 in other embodiments.

The CT scanner 300 includes a CT source 302 emitting X-rays 304 through the anti-vibration fixture 100 (and thereby the component for NDT 106). The CT scanner 300 further includes a CT detector 306 for capturing the X-rays 304 emitted from the CT source 302 through the anti-vibration fixture 100. The data generated at the CT detector 306 can be used to generate images (2D and/or 3D) of the external and/or internal characteristics of the component for NDT 106. Advantageously, by using the anti-vibration fixture 100, the images generated by the CT scanner 300 can be of higher quality.

Figure 4:
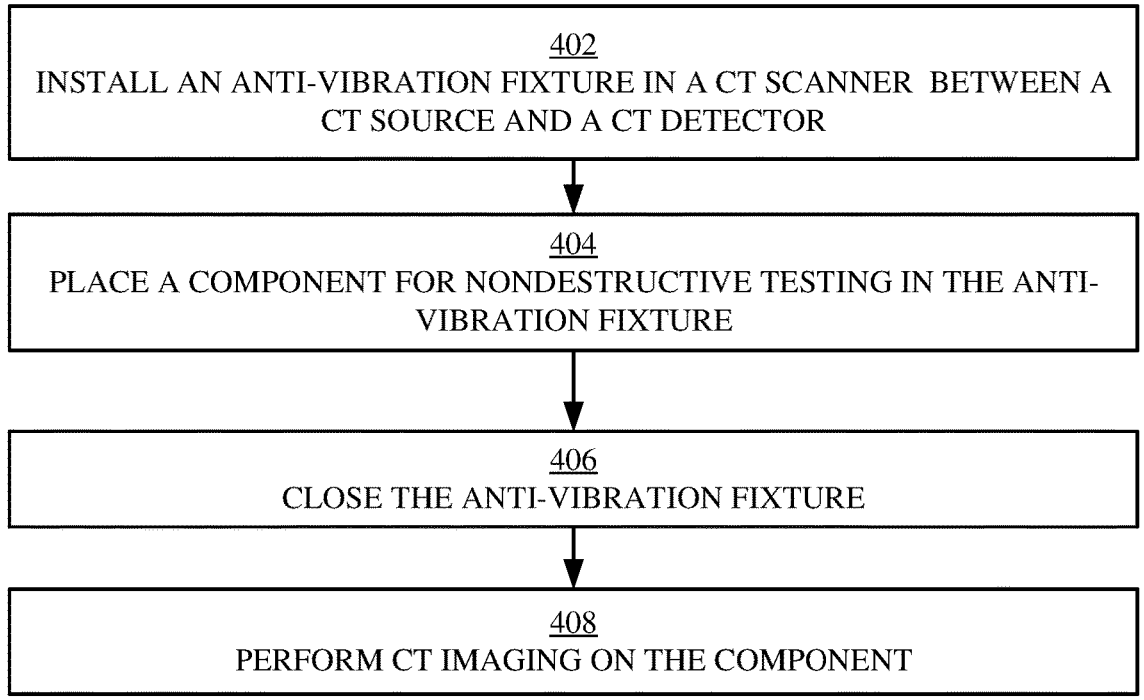
FIG. 4 illustrates a flowchart of an example method for performing NDT on a component using an anti-vibration fixture, in accordance with some embodiments of the present disclosure.

FIG. 4 illustrates a flowchart of an example method 400 for performing NDT on a component using an anti-vibration fixture, in accordance with some embodiments of the present disclosure. The method 400 can be performed by a technician in a lab setting including a CT scanner 300. In some embodiments, the method 400 is performed autonomously by one or more robotic machines capable of loading, rotating, and unloading the anti-vibration fixture before, during, and after CT scanning.

Operation 402 includes installing an anti-vibration fixture in a CT scanner between a CT source and a CT detector. In some embodiments, the anti-vibration fixture comprises the anti-vibration fixture 100 of FIG. 1 or the anti-vibration fixture 200 of FIG. 2.

Operation 404 includes placing a component for NDT in the anti-vibration fixture. In some embodiments, the component for NDT is a PCB, an electronic component, or another manufactured part or assembly. In some embodiments, operation 404 includes aligning the component for NDT with one or more alignment features in the anti-vibration fixture. Such alignment features can be, for example, cutouts (e.g., windows, slots, holes, etc.) in the radiolucent enclosure and/or the vibration-dampening pad that demonstrate the proper orientation, position, and/or other configuration of the component for NDT within the anti-vibration fixture.

Operation 406 includes closing the anti-vibration fixture. In some embodiments, operation 406 includes rotating a face of the radiolucent enclosure about a hinge and clasping the rotated face in the closed position. Further, in some embodiments, operation 406 includes actuating one or more pins to connect opposing faces of the radiolucent enclosure. In such embodiments, the one or more pins can be threaded bolts that affix one face of the radiolucent enclosure to a vibration-dampening pad and/or to an opposing face of the radiolucent enclosure. In some embodiments, operation 406 includes tightening the one or more pins to a predetermined torque.

Operation 408 includes performing CT imaging on the component for NDT. Operation 408 can include emitting X-rays from a CT source on one side of the anti-vibration fixture and aggregating data from a CT detector on an opposite side of the anti-vibration fixture. In some embodiments, operation 408 includes generating one or more 2D or 3D images of internal and/or external aspects of the component for NDT based on the data aggregated from the CT detector. Advantageously, the generated 2D or 3D images will exhibit improved quality insofar as the component for NDT experiences less vibration when undergoing the CT imaging.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is an anti-vibration fixture. The anti-vibration fixture includes a radiolucent enclosure; a vibration-dampening material attached to an inside face of the radiolucent enclosure and configured to receive a component for nondestructive testing by computed tomography (CT) scanning; and a plurality of fasteners attached to opposing faces of the radiolucent enclosure.

Example 2 includes the anti-vibration fixture of example 1, including or excluding optional features. In this example, the anti-vibration fixture includes a chuck rigidly attached to a driveshaft, wherein the chuck is configured to hold the radiolucent enclosure.

Example 3 includes the anti-vibration fixture of any one of examples 1 to 2, including or excluding optional features. In this example, the radiolucent enclosure comprises a clam-shaped enclosure. Optionally, the radiolucent enclosure further comprises: a hinge connecting the opposing faces of the radiolucent enclosure and enabling at least one of the faces to pivot about the hinge; and a fastener for fixing two edges of the radiolucent enclosure together in a closed position.

Example 4 includes the anti-vibration fixture of any one of examples 1 to 3, including or excluding optional features. In this example, the radiolucent enclosure includes at least one alignment feature for properly locating the component for nondestructive testing within the anti-vibration fixture.

Example 5 includes the anti-vibration fixture of any one of examples 1 to 4, including or excluding optional features. In this example, the radiolucent enclosure comprises a continuous fiber-reinforced polymer matrix composite material.

Example 6 includes the anti-vibration fixture of any one of examples 1 to 5, including or excluding optional features. In this example, the radiolucent enclosure comprises a discontinuous fiber-reinforced polymer matrix composite material.

Example 7 includes the anti-vibration fixture of any one of examples 1 to 6, including or excluding optional features. In this example, the vibration-dampening material is a foam.

Example 8 includes the anti-vibration fixture of any one of examples 1 to 7, including or excluding optional features. In this example, the vibration-dampening material is a silicone rubber.

Example 9 includes the anti-vibration fixture of any one of examples 1 to 8, including or excluding optional features. In this example, the component for nondestructive testing comprises a Printed Circuit Board (PCB).

Example 10 is a system. The system includes a computed tomography (CT) scanner for nondestructive testing, the CT scanner comprising a CT source and a CT detector; an anti-vibration fixture positioned between the CT source and the CT detector, wherein the anti-vibration fixture comprises: a radiolucent enclosure; a vibration-dampening material attached to an inside face of the radiolucent enclosure and configured to receive a component for nondestructive testing by the CT scanner; and a plurality of fasteners attached to opposing faces of the radiolucent enclosure.

Example 11 includes the system of example 10. In this example, the system includes the anti-vibration fixture of any one of Examples 2-9.

Example 12 is a method. The method includes installing an anti-vibration fixture in a Computed Tomography (CT) scanner between a CT source and a CT detector, wherein the anti-vibration fixture comprises: a radiolucent enclosure; a vibration-dampening material attached to an inside face of the radiolucent enclosure and configured to receive a component for nondestructive testing by the CT scanner; and a plurality of fasteners attached to opposing faces of the radiolucent enclosure; placing the component for nondestructive testing in the radiolucent enclosure and against the vibration-dampening material; closing the radiolucent enclosure by actuating the plurality of fasteners to a predetermined torque; and performing CT imaging on the component for nondestructive testing in the anti-vibration fixture using the CT scanner.

What is claimed is:

1. An anti-vibration fixture comprising:
   a radiolucent enclosure;
   a vibration-dampening material attached to an inside face of the radiolucent enclosure and configured to receive a component for nondestructive testing by computed tomography (CT) scanning;
   a plurality of fasteners attached to opposing faces of the radiolucent enclosure; and
   an outrigger system comprising at least one counterweight and configured to stabilize the radiolucent enclosure during rotation.

2. The anti-vibration fixture of claim 1, further comprising:
   a chuck rigidly attached to a driveshaft, wherein the chuck is configured to hold the radiolucent enclosure.

3. The anti-vibration fixture of claim 1, wherein the radiolucent enclosure comprises a clam-shaped enclosure.

4. The anti-vibration fixture of claim 3, wherein the radiolucent enclosure further comprises:
   a hinge connecting the opposing faces of the radiolucent enclosure and enabling at least one of the faces to pivot about the hinge; and
   a fastener for fixing two edges of the radiolucent enclosure together in a closed position.

5. The anti-vibration fixture of claim 1, wherein the radiolucent enclosure includes at least one alignment feature for properly locating the component for nondestructive testing within the anti-vibration fixture.

6. The anti-vibration fixture of claim 1, wherein the radiolucent enclosure comprises a continuous fiber-reinforced polymer matrix composite material.

7. The anti-vibration fixture of claim 1, wherein the radiolucent enclosure comprises a discontinuous fiber-reinforced polymer matrix composite material.

8. The anti-vibration fixture of claim 1, wherein the vibration-dampening material is a foam.

9. The anti-vibration fixture of claim 1, wherein the vibration-dampening material is a silicone rubber.

10. The anti-vibration fixture of claim 1, wherein the component for nondestructive testing comprises a Printed Circuit Board (PCB).

11. A system comprising:
    a computed tomography (CT) scanner for nondestructive testing, the CT scanner comprising a CT source and a CT detector;
    an anti-vibration fixture positioned between the CT source and the CT detector, wherein the anti-vibration fixture comprises:

a radiolucent enclosure;
a vibration-dampening material attached to an inside face of the radiolucent enclosure and configured to receive a component for nondestructive testing by the CT scanner;
a plurality of fasteners attached to opposing faces of the radiolucent enclosure; and
an outrigger system comprising at least one counterweight and configured to stabilize the radiolucent enclosure during rotation.

12. The system of claim 11, further comprising:
a chuck rigidly attached to a driveshaft, wherein the chuck is configured to hold the radiolucent enclosure.

13. The system of claim 11, wherein the radiolucent enclosure comprises a clam-shaped enclosure, and wherein the radiolucent enclosure further comprises:
a hinge connecting the opposing faces of the radiolucent enclosure and enabling at least one of the faces to pivot about the hinge; and
a fastener for fixing two edges of the radiolucent enclosure together.

14. The system of claim 11, wherein the radiolucent enclosure includes at least one alignment feature for properly locating the component for nondestructive testing within the anti-vibration fixture.

15. The system of claim 11, wherein the radiolucent enclosure comprises at least one material selected from a group consisting of: a continuous fiber-reinforced polymer matrix composite material, and a discontinuous fiber-reinforced polymer matrix composite material; and
wherein the vibration-dampening material is selected from a group consisting of: a foam, and a silicone rubber.

16. A method comprising:
installing an anti-vibration fixture in a Computed Tomography (CT) scanner between a CT source and a CT detector, wherein the anti-vibration fixture comprises:
a radiolucent enclosure;
a vibration-dampening material attached to an inside face of the radiolucent enclosure and configured to receive a component for nondestructive testing by the CT scanner;
a plurality of fasteners attached to opposing faces of the radiolucent enclosure; and
an outrigger system comprising at least one counterweight and configured to stabilize the radiolucent enclosure during rotation;
placing the component for nondestructive testing in the radiolucent enclosure and against the vibration-dampening material;
closing the radiolucent enclosure by actuating the plurality of fasteners to a predetermined torque; and
performing CT imaging on the component for nondestructive testing in the anti-vibration fixture using the CT scanner.

17. The anti-vibration fixture of claim 2, wherein the outrigger system is disposed between an upper portion of the chuck and a lower portion of the radiolucent enclosure, and wherein the outrigger system lowers a center of gravity of the anti-vibration fixture towards the chuck.

18. The anti-vibration fixture of claim 17, wherein the at least one counterweight comprises a plurality of counterweights, and wherein the plurality of counterweights are symmetrically disposed about the anti-vibration fixture.

19. The anti-vibration fixture of claim 17, wherein the at least one counterweight is asymmetrically disposed about the anti-vibration fixture, and wherein the at least one counterweight is configured to align the center of gravity of the anti-vibration fixture with a central axis of the chuck.

20. The anti-vibration fixture of claim 17, wherein the outrigger system comprises a composite material having a dense-particulate reinforcement.

* * * * *